United States Patent
Tabei

(10) Patent No.: US 7,552,313 B2
(45) Date of Patent: Jun. 23, 2009

(54) VLIW DIGITAL SIGNAL PROCESSOR FOR ACHIEVING IMPROVED BINARY TRANSLATION

(75) Inventor: Kazuhiko Tabei, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 327 days.

(21) Appl. No.: 11/008,927

(22) Filed: Dec. 13, 2004

(65) Prior Publication Data

US 2005/0138327 A1 Jun. 23, 2005

(30) Foreign Application Priority Data

Dec. 22, 2003 (JP) ............................. 2003-425838

(51) Int. Cl.
*G06F 9/30* (2006.01)
(52) U.S. Cl. ...................................... 712/205; 712/214
(58) Field of Classification Search .................. 712/24, 712/205, 206, 214, 215
See application file for complete search history.

(56) References Cited

U.S. PATENT DOCUMENTS

| | | | |
|---|---|---|---|
| 5,828,886 A | | 10/1998 | Hayashi |
| 5,880,984 A | * | 3/1999 | Burchfiel et al. ............ 708/501 |
| 6,026,478 A | * | 2/2000 | Dowling ....................... 712/24 |
| 6,170,051 B1 | * | 1/2001 | Dowling ...................... 712/225 |
| 6,216,220 B1 | * | 4/2001 | Hwang ........................ 712/219 |
| 6,317,820 B1 | * | 11/2001 | Shiell et al. ................... 712/32 |
| 6,363,475 B1 | * | 3/2002 | Dowling ...................... 712/206 |
| 2001/0052053 A1 | * | 12/2001 | Nemirovsky et al. ......... 711/138 |

FOREIGN PATENT DOCUMENTS

| | | |
|---|---|---|
| JP | 7-234792 | 9/1995 |
| JP | 2003-140910 A | 5/2003 |

OTHER PUBLICATIONS

Free On-Line Dictionary of Computing (FOLDOC). ©1995. www.foldoc.org search term: program counter.*

* cited by examiner

*Primary Examiner*—Aimee J Li
(74) *Attorney, Agent, or Firm*—Foley & Lardner LLP

(57) ABSTRACT

A VLIW digital signal processor is composed of a program memory including first to n-th banks, first to n-th address counters, a fetch block, and an instruction executing section. The first to n-th banks store therein first to n-th programs, respectively. The first to n-th address counters respectively indicates addresses at which next instructions to be executed next, selected out of VLIW instructions within said first to n-th programs, are stored in said first to n-th banks. The fetch block is configured to fetch said next instructions from said addresses, respectively, and to generate a resultant VLIW instruction from said next instructions. The instruction executing section is configured to receive said resultant VLIW instruction, and to execute said resultant VLIW instruction in a single instruction executing cycle.

5 Claims, 1 Drawing Sheet

VLIW DIGITAL SIGNAL PROCESSOR FOR ACHIEVING IMPROVED BINARY TRANSLATION

BACKGROUND OF THE INVENTION

1. Field of the Invention

The present invention generally relates to VLIW DSPs (very long instruction word digital signal processor), and methods for operating the same. More specifically, the present invention is directed to improvement in binary translation for VLIW DSPs.

2. Description of the Related Art

The VLIW architecture is known as one of the promising DSP architectures due to the higher performance with simple hardware implementations. One feature of VLIW architectures is that each instruction includes multiple sub-instructions; VLIW architectures specify multiple operations (such as load, store, arithmetic processing, and branching) per instruction. This allows VLIW DSPs to perform highly efficient parallel processing, and to thereby provide high-speed data processing. A recent trend is to increase the degree of parallelism (that is, the number of sub instructions within a single VLIW instruction) for achieving higher data processing speed. Japanese Open Laid Patent Application No. Jp-A-Heisei 7-234792 discloses a technique for generating program codes with increased degree of parallelism.

Binary translation, which designates a technique for allowing specific software adapted to a certain DSP to be executable on other DSPs, is one of the important aspects in the development of VLIW DSPs. It is not preferable to newly develop software for a newly developed DSP, in view of the reduction in the cost and the TAT (turn around time). A next-generation DSP is preferably adapted to execute software designed for the old-generation DSPs.

The binary translation technique may constitute an important aspect, especially in DSPs for real-time signal processing in multi-task situation, for example, DSPs for simultaneously performing audio and video data processing operations. Such DSPs require sophisticated programming techniques to achieve high execution efficiency. Therefore, hand assembling (namely, manual programming with an assembly language or a machine language) is often used to develop software in place of high-level language programming, such as C language programming. The use of hand assembling, however, undesirably requires increased man-hours for developing DSP software. It would be advantageous if DSPs requiring hand-assembled programs are adapted to binary translation.

Two sorts of techniques are known as binary translation: one is static binary translation, and the other is dynamic binary translation. Static binary translation involves translating codes within a program off line before the program is executed. Dynamic binary translation, on the other hand, involves translating codes within a program during executing the program within the DSP.

Japanese Open Laid Patent Application No. 2003-140910A discloses a dynamic binary translation technique. This conventional-dynamic binary translation technique addresses avoiding a conflict over a hardware resource within a VLIW processor which requires avoiding resource conflict between instructions using software. In the conventional dynamic binary translation technique, a processor is designed to detect recourse conflicts, and provided with a resource conflict check register indicating the occurrence of resource conflicts. When performing dynamic binary translation, the processor checks whether or not a resource conflict occurs through actually executing codes. This effectively reduces processing time required for instruction scheduling in dynamic binary translation.

One of the issues in binary translation for DSPs is that a VLIW DSP adapted to a program having an enhanced degree of parallelism does not exhibit its intrinsic superior performance, when executing a program having a reduced degree of parallelism. An improvement in the processing speed cannot be expected when a program adapted to a VLIW DSP having a reduced degree of parallelism is executed on another VLIW DSP having an enhanced degree of parallelism, because of a reduced number of sub-instructions per instruction. Let us consider a case, for instance, where a pair of programs "A" and "B" adapted to a VLIW DSP having a reduced degree of parallelism. Even when the programs "A" and "B" are executed by such a VLIW DSP having an enhance degree of parallelism, the execution speed is restricted due to the reduced number of sub instructions per instruction within the programs "A" and "B"; the improvement in the execution speed is not achieved by the enhancement in the degree of parallelism of the VLIW DSP hardware.

There is a need for providing a binary translation technique for achieving high-speed operation through making use of the performance of a highly parallelized VLIW DSP even in the case where a program adapted to a VLIW DSP having a reduced degree of parallelism is executed on the highly parallelized VLIW DSP.

SUMMARY OF THE INVENTION

Therefore, an object of the present invention is to provide a binary translation technique for achieving high-speed operation through making use of the performance of a highly parallelized VLIW DSP even in the case where a program adapted to a VLIW DSP having a reduced degree of parallelism is executed on the highly parallelized VLIW DSP.

In an aspect of the present invention, a VLIW digital signal processor is composed of a program memory including first to n-th banks, first to n-th address counters, a fetch block, and an instruction executing section. The first to n-th banks store therein first to n-th programs, respectively. The first to n-th address counters respectively indicates addresses at which next instructions to be executed next, selected out of VLIW instructions within said first to n-th programs, are stored in said first to n-th banks. The fetch block is configured to fetch said next instructions from said addresses, respectively, and to generate a resultant VLIW instruction from said next instructions. The instruction executing section is configured to receive said resultant VLIW instruction, and to execute said resultant VLIW instruction in a single instruction executing cycle.

The VLIW DSP thus constructed generates the corresponding new VLIW instruction from a set of the next VLIW instructions to be executed next, and then executes the resultant VLIW instruction. This allows the VLIW DSP to concurrently execute a plurality of programs designed for VLIW DSPs with a reduced degree of parallelism, while making effective use of the degree of parallelism of the VLIW DSP.

BRIEF DESCRIPTION OF THE DRAWINGS

For a better understanding of the present invention, reference is made of a detailed description to be read in conjunction with the accompanying drawing, in which.

DESCRIPTION OF THE PREFERRED EMBODIMENTS

Figure 1:
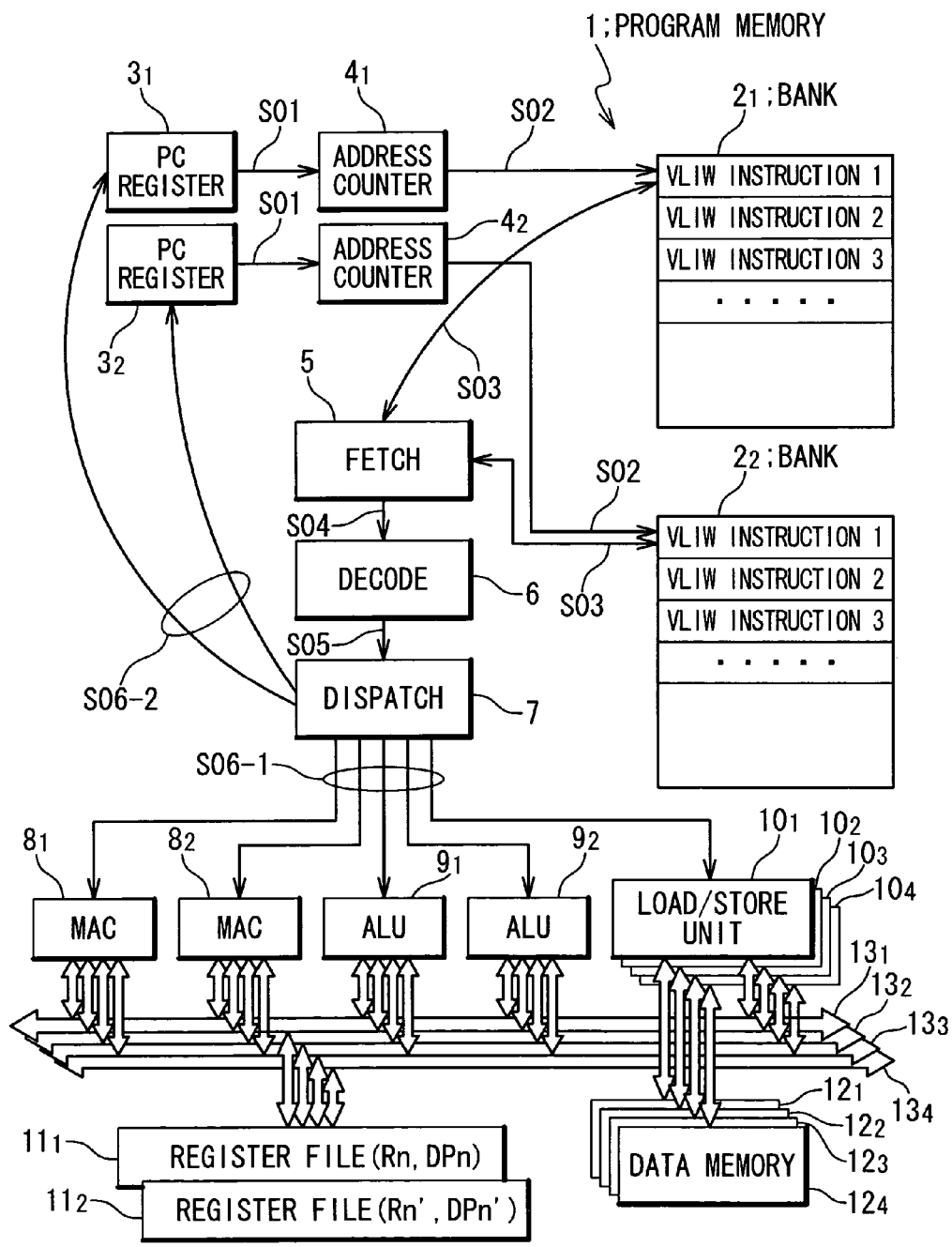
FIG. 1 is a block diagram for schematically showing an arrangement of a VLIW DSP in one embodiment of the present invention.

Referring now to a drawing, various preferred embodiments of the present invention will be described.

DSP Implementation

In one embodiment, as illustrated in FIG. 1, a VLIW DSP, which is designed to exhibit an enhanced degree of parallelism, is provided with a program memory 1, a plurality of program counter registers (PC registers) 3, and a plurality of address counters 4. The program memory 1 is composed of a plurality of banks $2_1$ and $2_2$. The banks $2_1$ and $2_2$ store therein programs to be executed, respectively. Both of the programs are described using a VLIW instruction set. The PC registers $3_1$ and $3_2$ contain start addresses of the programs stored in the banks $2_1$ and $2_2$, respectively. The address counters $4_1$ and $4_2$ indicate the addresses of the VLIW codes to be executed next, for the programs stored in the banks $2_1$ and $2_2$.

A fetch block 5 fetches the VLIW instructions to be executed next from the respective banks $2_1$ and $2_2$. The fetch block 5 is designed to combine the fetched VLIW instructions to newly generate a VLIW instruction, when the fetched VLIW instructions include a reduced number of sub-instructions. As is described later in detail, this is important for making use of the enhanced degree of parallelism of the VLIW DSP, and thereby achieving high-speed processing.

The VLIW DSP additionally includes a decode block 6, a dispatch block 7, multiplier-accumulator (MAC) units 8, arithmetic-logic units (ALU) 9, and load/store units 10; the MACs 8, the ALUs 9, and the load/store units 10 may be distinguished from one another by indexes attached to the numerals, if necessary. These units are used to execute VLIW instructions received from the fetch block 5. The decode block 6 and the dispatch block 7 are designed to control the MACs 8, the ALUs 9, and the load/store units 10 in response to the VLIW instructions supplied from the fetch block 5. The MACs 8, the ALUs 9, and the load/store units 10 operate under the control of the decode block 6 and the dispatch block 7 for executing sub instructions with in the VLIW instructions; the MACs 8, the ALUs 9, and the load/store units 10 may be collectively referred to as "execution units".

The numbers of the MACs 8, the ALUs 9, and the load/store units 10 are dependent on the desired degree of parallelism of the VLIW DSP. As the numbers of the MACs 8, the ALUs 9, and the load/store unit 10 are increased, the allowable number of sub instructions per instruction is also increased. In this embodiment, the MACs 8 and the ALUs 9 are duplicated within the VLIW DSP, and thereby the VLIW DSP is provided with the increased degree of parallelism. In other words, the degree of parallelism is increased within the VLIW DSP by adopting a dual MAC/ALU architecture.

The MACs 8, the ALUs 9, and the load/store units 10 are connected via a bus 13 to register files 11 and data memories 12. The register files 11 are composed of a set of registers used for performing arithmetic operations on the MACs 8 and the ALUs 9. The data memories 12 store therein data to be arithmetically processed by the MACs 8 and the ALUs 9, and the resultant data obtained by the arithmetic operations.

Details of the functions of the decode block 6, the dispatch block 7, the MACs 8, the ALUs 9, and the load/store units 10 are explained in the following. The decode block 6 decodes VLIW instructions received from the fetch block 5, to specify sub-instructions (or operations) to be executed by the execution units. The decode block 6 forwards the specified sub-instructions to the dispatch block 7. The dispatch block 7 dispatches the sub-instructions to the associated execution units, and allows each of the execution units to execute the sub instruction dispatched thereto. Additionally, in the case where the VLIW instructions include a branching sub-instruction, the dispatch block 7 transfers a branch destination address indicated in the branch sub-instruction to the associated PC register 3. The MACs 8 are designed to execute multiply-and-accumulate operations in response to the sub-instructions dispatched thereto. The ALUs 9 are designed to execute arithmetic operations, logic operations, and other operations, including add operations, subtract operations, logical OR operations, and logical AND operations. The load/store units 10 are used to provide accesses to the data memories 12 from the MACs 8 and the ALUs 9. The load/store units $10_1$ to $10_4$ are designed to load data from the data memories $12_1$ to $12_4$, respectively, and to supply the loaded data via the buses $13_1$ to $13_4$ to the MACs 8 and the ALUs 9. Furthermore, the load/store units $10_1$ to $10_4$ are designed to receive arithmetic results generated by the MACs 8 and the ALUs 9 via the buses $13_1$ to $13_4$ respectively, and to store these arithmetic results into the data memories $12_1$ to $12_4$, respectively.

Plural sets of the above-explained banks 2, PC registers 3, address counters 4, and register files 11 are prepared, the numbers of which are equal to the number of programs that are executed at the same time by the VLIW DSP. In this embodiment, the numbers of the banks 2, the PC registers 3, the address counter 4, and the register files 11 are equal to 2. It should be understood that the numbers of the banks 2, the PC registers 3, the address counters 4, and the register files 11 are not limited to 2.

DSP Operation

Schematically, the VLIW DSP in this embodiment is configured to execute multiple VLIW programs in which VLIW instruction are each composed of a reduced number of sub-instructions. More specifically, the VLIW DSP combines the VLIW instructions included in the respective programs, to thereby produce a new VLIW instruction associated therewith, and executes the newly produced VLIW instruction. This execution operation is equivalent to such an operation that multiple VLIW instructions fetched from the banks $2_1$ and $2_2$ are executed at the same time within one instruction executing cycle. Consequently, the VLIW DSP in this embodiment makes effective use of the enhanced degree of parallelism provided thereto. The following is descriptions on an exemplary procedure in which a plurality of programs having a reduced degree of parallelism are executed in parallel by the VLIW type DSP in this embodiment.

The procedure begins with forwarding the program start addresses from the PC registers $3_1$ and $3_2$ to the address counters $4_1$ and $4_2$, respectively, at Step S01. This configures the address counters $4_1$ and $4_2$ to indicate the addresses at which the VLIW instructions to be executed next are stored in the banks $2_1$ and $2_2$ at Step S02.

The fetch block 5 fetches the VLIW instructions from the indicated addresses of the banks $2_1$ and $2_2$ at Step S03.

The fetch block 5 rearranges the fetched VLIW instructions, and generates a new VLIW instruction including an increased number of sub-instructions. The fetch block 5 then transfers the resultant VLIW instruction to the decode block 6 at Step S04.

It should be noted that the VLIW instructions received from the banks $2_1$ and $2_2$ may involve the same register name; this may cause an undesirable operation when the resultant VLIW instruction is executed. In most cases where the programs stored in the banks $2_1$ and $2_2$ are adapted to old-generation DSPs, the programs are not designed to be simultaneously executed in parallel. This may result in that the VLIW instructions fetched from the banks $2_1$ and $2_2$ involve the same register name. If so, this may prevent the VLIS DSP from executing the VLIW instructions at the same time.

In order to avoid such problem, the fetch block 5 rewrites the fetched VLIW instructions to allocate a register described in the VLIW instruction fetched from the bank $2_1$, and another register described in the VLIW instruction fetched from the bank $2_2$ to the different register files 11. The fetch block 5 combines the resultant VLIW instructions to generate a new VLIW instruction to be executed next.

An exemplary procedure of generating a new VLIW instruction is described, assuming that general-purpose registers and memory pointers within the register file $11_1$ are identified by register names of "Rn", and "DPn", respectively, and that general-purpose registers and memory pointers within the register file $11_2$ within the register file $11_2$ are identified by register names of "Rn'" and "DPn'", where symbols "n" each represent an integer equal to or larger than zero. It should be noted that a memory pointer is one sort of registers. When both of the VLIW instruction "A" and a VLIW instruction "B" contain a description of the register names "Rn" and "DPn", the register name "Rn" described in the VLIW instruction "B" is rewritten into "Rn'", and the register name "DPn" described in the VLIW instruction "B" is rewritten into "DPn'". After the VLIW instruction "B" is rewritten, the VLIW instruction "A" is combined with the rewritten VLIW instruction "B" to generate a new VLIW instruction.

More specifically, for the case where the VLIW instruction "A" fetched from the bank $2_1$ reads "R0=R1*R3+R3, R8=*DP0, R9=*DP1", and the VLIW instruction "B" fetched from the bank $2_2$ reads "R3=R2*R1+R0, *DP0=R8, *DP1=R9", the fetch block 5 generates a VLIW instruction reading "R0=R1*R3+R3, R8=*DP0, R9=*DP1, R3'=R2'*R1'+R0', *DP0'=R8', *DP1'=R9'." As a result, the VLIW instruction fetched from the bank $2_1$ is allocated to a register within the register file $11_1$, while the VLIW instruction fetched from the bank $2_2$ is allocated to a register within the register file $11_2$. This allows these VLIW instructions to be executed at the same time.

This is followed by decoding the resultant VLIW instruction at Step SO5. The decode block 6 breaks up the VLIW instruction received from the fetch block 5 into sub-instructions to be executed by the respective execution units, and then forwards the sub-instructions to the dispatch block 7.

In response to the received sub-instructions, the dispatch block 7 develop execution control signals to the associated execution units, and thereby allows the associated execution units to execute the operations identified by the sub-instructions at Step S06-1. For the case where the sub-instructions includes a branch instruction, the dispatch block 7 further forwards a branch destination address indicated in the branch instruction to the PC register 3 associated therewith at Step S06-2.

As described above, the VLIW DSP in this embodiment is designed to generate the corresponding new VLIW instruction from VLIW instructions of the programs stored in the banks, and to execute the generated VLIW instruction within one instruction execution cycle. As a consequence, the VLIW DSP in this embodiment can concurrently execute a plurality of programs designed for VLIW DSPs with a reduced degree of parallelism, while making effective use of the enhanced degree of parallelism thereof.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. A digital signal processor comprising:
   a program memory including a plurality of banks storing a plurality of programs, each of the programs including a plurality of instructions;
   a plurality of address counters storing addresses at which ones of the instructions are stored, said ones of the instructions to be executed in a next instruction execution cycle, and said addresses being correlated with said plurality of banks;
   a fetch block configured to fetch the instructions stored at the addresses stored by at least two of the address counters, from the banks corresponding to the addresses stored by said at least two of the address counters, a first one of the fetched instructions corresponding to a first program of the programs and a second one of the fetched instructions corresponding to a second program of the programs, and to combine said fetched instructions to generate a reallocated instruction;
   a plurality of register files; and
   an instruction executing section configured to receive said reallocated instruction and to execute said reallocated instruction in said next instruction executing cycle,
   wherein said fetch block is configured to, when one of said plurality of register files includes both a first register described in said instructions of said first program and a second register described in said instructions of said second program, rewrite said fetched instructions so as to replace said first register with a third register which is not incorporated within said one of said plurality of register files, and to generate said reallocated instruction by combining said rewritten instructions.

2. The digital signal processor according to claim 1, further comprising a plurality of program counter registers storing respective start addresses of said plurality of programs;
   wherein said start addresses stored in said plurality of program counter registers are transferred to one of said plurality of address counters associated with said plurality of program counter registers, respectively.

3. The digital signal processor according to claim 1,
   wherein said instruction executing section comprises:
      a decode block configured to receive said reallocated instruction and generate subinstructions from said reallocated instruction;
      a dispatch block; and
      a plurality of execution units,
   wherein said dispatch block supplies execution control signals to said plurality of execution units in response to said subinstructions, and
   wherein each of said execution units performs an associated one of operations specified by said subinstructions in response to said execution control signals.

4. The digital signal processor according to claim 3,
   wherein said execution units comprise:
      a plurality of multiplier-accumulator units; and
      a plurality of arithmetic-logic units.

5. A method of operating a digital signal processor, the method comprising;
   i. storing, at a plurality of banks, a plurality of programs, each of the programs including a plurality of instructions;
   ii. storing, at a plurality of address counters, addresses at which ones of the instructions are stored, said ones of the instructions to be executed in a next instruction execution cycle, and said addresses being correlated with said plurality of banks;

iii. receiving the instructions stored at the addresses stored by at least two of the address counters, from the banks corresponding to the addresses stored by said at least two of the address counters, a first one of the received instructions corresponding to a first program of the programs, and a second one of the received instructions corresponding to a second program of the programs;

iv. generating a reallocated instruction by combining said received instructions; and v. executing said reallocated instruction in said next instruction executing cycle, vi. wherein generating the reallocated instruction comprises, when one of a plurality of register files includes both a first register described in said instructions of said first program and a second register described in said instructions of said second program, rewriting said received instructions so as to replace said first register with a third register which is not incorporated within said one of said plurality of register files, and combining said rewritten instructions.

* * * * *